(12) United States Patent
Tanaka et al.

(10) Patent No.: US 10,026,242 B2
(45) Date of Patent: Jul. 17, 2018

(54) STATUS INFORMATION DISPLAY DEVICE FOR WHEELED WORK VEHICLE, MAINTENANCE-SCREEN DISPLAY METHOD FOR WHEELED WORK VEHICLE, AND MAINTENANCE-SCREEN DISPLAY PROGRAM FOR WHEELED WORK VEHICLE

(71) Applicant: KOMATSU LTD., Minato-ku, Tokyo (JP)

(72) Inventors: Osamu Tanaka, Hiratsuka (JP); Takehiro Shibata, Kanagawa (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 14/763,256

(22) PCT Filed: Dec. 26, 2014

(86) PCT No.: PCT/JP2014/084676
§ 371 (c)(1),
(2) Date: Jul. 24, 2015

(87) PCT Pub. No.: WO2015/088049
PCT Pub. Date: Jun. 18, 2015

(65) Prior Publication Data
US 2016/0189448 A1 Jun. 30, 2016

(51) Int. Cl.
*G01M 17/00* (2006.01)
*G06F 7/00* (2006.01)
(Continued)

(52) U.S. Cl.
CPC ............ *G07C 5/0825* (2013.01); *B60K 35/00* (2013.01); *B60K 37/02* (2013.01); *E02F 9/267* (2013.01); *B60K 2350/352* (2013.01)

(58) Field of Classification Search
CPC ...... G07C 5/0825; B60K 35/00; B60K 37/02; B60K 2350/352; E02F 9/267
See application file for complete search history.

(56) References Cited

U.S. PATENT DOCUMENTS

| 7,489,303 B1 * | 2/2009 | Pryor ..................... B60K 35/00 345/173 |
| 8,160,784 B2 * | 4/2012 | Fukumoto ............ A01C 11/003 701/50 |

(Continued)

FOREIGN PATENT DOCUMENTS

| CN | 1337504 | 2/2002 |
| CN | 2559688 | 7/2003 |

(Continued)

OTHER PUBLICATIONS

International Search Report dated Mar. 31, 2015 from corresponding International Application No. PCT/JP2014/084676, including English translation, 2 pages.

(Continued)

*Primary Examiner* — Jean Paul Cass
(74) *Attorney, Agent, or Firm* — Fish & Richardson P.C.

(57) ABSTRACT

A state information display for a wheel-type working vehicle includes: a state information displaying unit that displays plural kinds of state information of the wheel-type working vehicle; and a display controller that controls display of the state information displaying unit. The display controller includes: a standard screen displaying unit that displays the plural kinds of state information in the form of a standard screen during an operation of the wheel-type working vehicle; a maintenance/inspection screen switching unit that switches from the standard screen to a maintenance/inspection screen for the wheel-type working vehicle to be displayed in response to a predetermined dedicated operation; and a speed information displaying unit that displays speed (Continued)

information of the wheel-type working vehicle in any one of areas defined in the maintenance/inspection screen when the maintenance/inspection screen is switched to be displayed by the maintenance/inspection screen switching unit.

6 Claims, 9 Drawing Sheets

(51) Int. Cl.

| | | |
|---|---|---|
| *G06F 11/30* | (2006.01) | |
| *G06F 19/00* | (2018.01) | |
| *G07C 5/00* | (2006.01) | |
| *G07C 5/08* | (2006.01) | |
| *E02F 9/26* | (2006.01) | |
| *B60K 37/02* | (2006.01) | |
| *B60K 35/00* | (2006.01) | |

(56) References Cited

U.S. PATENT DOCUMENTS

| | | | |
|---|---|---|---|
| 2002/0015062 A1 | 2/2002 | Shimazu et al. | |
| 2005/0038579 A1* | 2/2005 | Lewis | E02F 9/267 |
| | | | 701/31.4 |
| 2006/0066507 A1* | 3/2006 | Yanagisawa | B60K 35/00 |
| | | | 345/7 |
| 2007/0171087 A1 | 7/2007 | Shimazu et al. | |
| 2009/0171529 A1* | 7/2009 | Hayatoma | B60K 35/00 |
| | | | 701/36 |
| 2012/0131615 A1* | 5/2012 | Kobayashi | H04N 5/44543 |
| | | | 725/40 |
| 2012/0245760 A1 | 9/2012 | Ikeya | |
| 2013/0035824 A1 | 2/2013 | Nakamura et al. | |
| 2013/0166998 A1* | 6/2013 | Sutherland | G06F 17/2247 |
| | | | 715/202 |
| 2014/0002708 A1* | 1/2014 | Kohno | H04N 5/232 |
| | | | 348/333.02 |
| 2014/0297160 A1 | 10/2014 | Magaki et al. | |
| 2016/0029002 A1* | 1/2016 | Balko | H04N 9/7921 |
| | | | 386/230 |
| 2016/0210034 A1* | 7/2016 | Zhu | G06F 3/04883 |
| 2016/0229405 A1* | 8/2016 | Shimizu | B60W 30/182 |
| 2017/0008452 A1* | 1/2017 | Kajita | B60R 16/02 |
| 2017/0108702 A1* | 4/2017 | Rabner | G02B 27/2242 |
| 2017/0180634 A1* | 6/2017 | Nakamura | G06F 1/1694 |

FOREIGN PATENT DOCUMENTS

| | | | | |
|---|---|---|---|---|
| CN | 2784469 | | 5/2006 | |
| JP | 2002121776 A | | 4/2002 | |
| JP | 2002327467 A | | 11/2002 | |
| JP | 2007276585 A | | 10/2007 | |
| JP | WO 2008146501 A1 * | | 12/2008 | B60K 35/00 |
| JP | 2011-231488 | | 11/2011 | |
| JP | 2014-181543 | | 9/2014 | |
| JP | 2014190091 A | | 10/2014 | |
| WO | WO 2011/074672 | | 6/2011 | |

OTHER PUBLICATIONS

Office Action in corresponding Chinese Application No. 2014800106165, dated Jun. 2, 2016, 22 pages, with English translation.

Office Action in corresponding Japanese Application No. JP 2015-531384, dispatched May 31, 2016, 5 pages, with English translation.

International Preliminary Report on Patentability dated Jun. 27, 2017 from corresponding International Application No. PCT/JP2014/084676, including English translation, 5 pages.

* cited by examiner

STATUS INFORMATION DISPLAY DEVICE FOR WHEELED WORK VEHICLE, MAINTENANCE-SCREEN DISPLAY METHOD FOR WHEELED WORK VEHICLE, AND MAINTENANCE-SCREEN DISPLAY PROGRAM FOR WHEELED WORK VEHICLE

CROSS-REFERENCE TO RELATED APPLICATIONS

This application claims priority to International Application No. PCT/JP2014/084676 filed on Dec. 26, 2014, the contents of which are incorporated herein by reference.

TECHNICAL FIELD

The present invention relates to a state information display for a wheel-type working vehicle that is provided to the wheel-type working vehicle to display plural kinds of state information of the working vehicle, a method for displaying a maintenance/inspection screen for a wheel-type working vehicle, and a program for displaying a maintenance/inspection screen for a wheel-type working vehicle.

BACKGROUND ART

According to a typical known technique, a display such as a liquid crystal display is installed in a cab of a wheel-type working vehicle such as a wheel loader or a motor grader, and plural kinds of state information of the work machine, which include driving speed, engine speed, hydraulic oil temperature, torque converter oil temperature and fuel amount, are displayed on a screen of the display (see, for instance, Patent Literature 1). An operator of the work machine operates the work machine, monitoring the screen.

According to another known technique, a display in a working vehicle is capable of switching information on a screen. Specifically, during the travelling of the working vehicle, the screen shows information including driving speed and engine speed, whereas when the working vehicle is in operation (e.g., a crane of the working vehicle is in operation), the screen shows information including the lifting state of the crane (see, for instance, Patent Literature 2).

CITATION LIST

Patent Literature(s)

Patent Literature 1: JP-A-2002-121776
Patent Literature 2: JP-A-2007-276585

SUMMARY OF THE INVENTION

Problems to be Solved by the Invention

In the case of a trouble in a wheel-type working vehicle, a service person may perform maintenance and/or inspection of the wheel-type working vehicle. When the service person does maintenance and/or inspection, the screen of a state information display is switched to a maintenance/inspection mode, in which the screen collectively shows various kinds of state information including engine speed, engine water temperature, hydraulic oil temperature and torque converter oil temperature to help the service person diagnose the trouble.

It should be noted that the screen in the maintenance/inspection mode shows not only the above elements for diagnosing the trouble, but also elements for adjusting a sensor or the like and for switching other important settings. Accordingly, a dedicated command known only to the service person needs to be entered on the state information display to switch the screen to the maintenance/inspection mode so that a non-authorized person such as an operator cannot switch the screen to the maintenance/inspection mode.

However, in the case of performing a maintenance/inspection operation in the maintenance/inspection mode, a typical screen of the state information display does not show speed information. Therefore, when the service person diagnoses the trouble or adjusts the sensor or the like in the travelling wheel-type working vehicle, the service person cannot check the speed of the wheel-type working vehicle while driving the wheel-type working vehicle.

An object of the invention is to provide a state information display for a wheel-type working vehicle, a method for displaying a maintenance/inspection screen for a wheel-type working vehicle, and a program for displaying a maintenance/inspection screen for a wheel-type working vehicle, which allow the speed of the wheel-type working vehicle to be checked during a maintenance/inspection operation.

Means for Solving the Problems

According to a first aspect of the invention, a state information display for a wheel-type working vehicle includes:
a state information displaying unit configured to display plural kinds of state information of the wheel-type working vehicle; and
a display controller configured to control display of the state information displaying unit, the controlling including:
   a standard screen displaying unit configured to display the plural kinds of state information in a form of a standard screen during an operation of the wheel-type working vehicle;
   a maintenance/inspection screen switching unit configured to switch the standard screen to display a maintenance/inspection screen for the wheel-type working vehicle in response to a predetermined dedicated operation; and
   a speed information displaying unit configured to display speed information of the wheel-type working vehicle in any one of areas defined in the maintenance/inspection screen.

In the first aspect of the invention, the speed information displaying unit displays the speed information of the wheel-type working vehicle when the maintenance/inspection screen is switched to be displayed. Therefore, a person in charge of maintenance/inspection can check the speed information during maintenance and/or inspection, so that he/she can safely perform maintenance and/or inspection while driving the wheel-type working vehicle.

According to a second aspect of the invention, in the state information display for the wheel-type working vehicle of the first aspect,
the wheel-type working vehicle works in a heavy-load operation mode for an operation oriented to a load or in a light-load operation mode for an operation oriented to fuel consumption, and
the display controller further includes an operation mode information displaying unit configured to display information about whether the wheel-type working vehicle works in the heavy-load operation mode or in the light-load operation mode in any one of the areas defined in the maintenance/inspection screen when the maintenance/inspection screen is switched to be displayed by the maintenance/inspection screen switching unit.

In the second aspect of the invention, even when the maintenance/inspection screen is switched to be displayed, the operation mode information of the wheel-type working vehicle is visible on the maintenance/inspection screen. Therefore, the person in charge of maintenance/inspection can check the operation mode information while performing maintenance and/or inspection, so that he/she can understand the operation state in further detail and thus easily diagnose a trouble or the like.

According to a third aspect of the invention, in the state information display for the wheel-type working vehicle of the first or second aspect, the wheel-type working vehicle is an engine-driven working vehicle, and the display controller further includes a gear position information displaying unit configured to display a gear position in any one of the areas defined in the maintenance/inspection screen when the maintenance/inspection screen is switched to be displayed by the maintenance/inspection screen switching unit.

In the third aspect of the invention, even when the maintenance/inspection screen is switched to be displayed, the actual gear position information is visible on the maintenance/inspection screen as well as the speed information of the wheel-type working vehicle. Therefore, the person in charge of maintenance/inspection can check the actual gear position information as well as the speed information while performing maintenance and/or inspection, so that he/she can understand the operation state in further detail and thus easily diagnose a trouble or the like. Further, a speed to be reached can be predicted in the adjustment of an accelerator or the like, so that the maintenance and/or inspection can be safely performed.

According to a fourth aspect of the invention, in the state information display for the wheel-type working vehicle of any one of the first to third aspects, the maintenance/inspection screen switching unit switches between a state information screen and a sensor adjustment screen, the state information screen showing plural kinds of state information different from the plural kinds of state information shown by the standard screen, the sensor adjustment screen being used for adjusting a sensor related to any one of the plural kinds of state information shown by the state information screen, and the speed information displaying unit displays the speed information not only in the state information screen but also in the sensor adjustment screen.

In the fourth aspect of the invention, the state information screen and the sensor adjustment screen both show the speed information, so that the speed information or the like can be checked during maintenance and/or inspection. Therefore, the person in charge of maintenance/inspection can adjust a sensor while safely driving the wheel-type working vehicle.

According to a fifth aspect of the invention, a method for displaying a maintenance/inspection screen for a wheel-type working vehicle includes:

displaying plural kinds of state information of the wheel-type working vehicle; and controlling display of the plural kinds of state information, the controlling including:

displaying the plural kinds of state information in a form of a standard screen during an operation of the wheel-type working vehicle; switching the standard screen to display the maintenance/inspection screen for the wheel-type working vehicle in response to a predetermined dedicated operation; and displaying speed information of the wheel-type working vehicle in one of areas defined in the maintenance/inspection screen.

According to a sixth aspect of the invention, a computer-readable program for displaying a maintenance/inspection screen for a wheel-type working vehicle, the program allowing a display controller to execute a method for displaying the maintenance/inspection screen for the wheel-type working vehicle, the method including:

displaying plural kinds of state information of the wheel-type working vehicle; and controlling display of the plural kinds of state information, the controlling including:

displaying the plural kinds of state information in a form of a standard screen during an operation of the wheel-type working vehicle;

switching the standard screen to display the maintenance/inspection screen for the wheel-type working vehicle in response to a predetermined dedicated operation; and displaying speed information of the wheel-type working vehicle in one of areas defined in the maintenance/inspection screen when the maintenance/inspection screen is switched to be displayed.

The fifth and sixth aspects of the invention provide the same advantageous effect(s) as described above.

DESCRIPTION OF EMBODIMENT(S)

[1] Overall Arrangement of Wheel Loader 1

Figure 1:
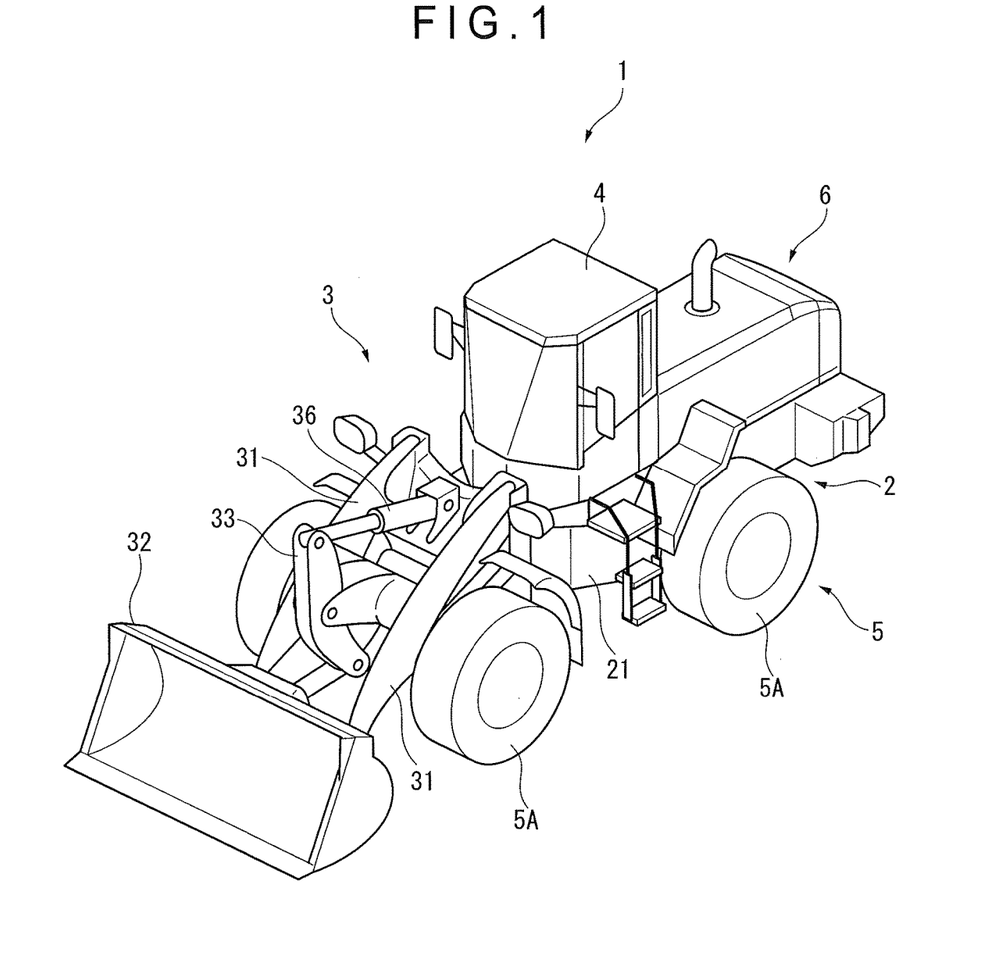
FIG. 1 is a perspective view showing a work machine according to an exemplary embodiment of the invention.
Figure 2:
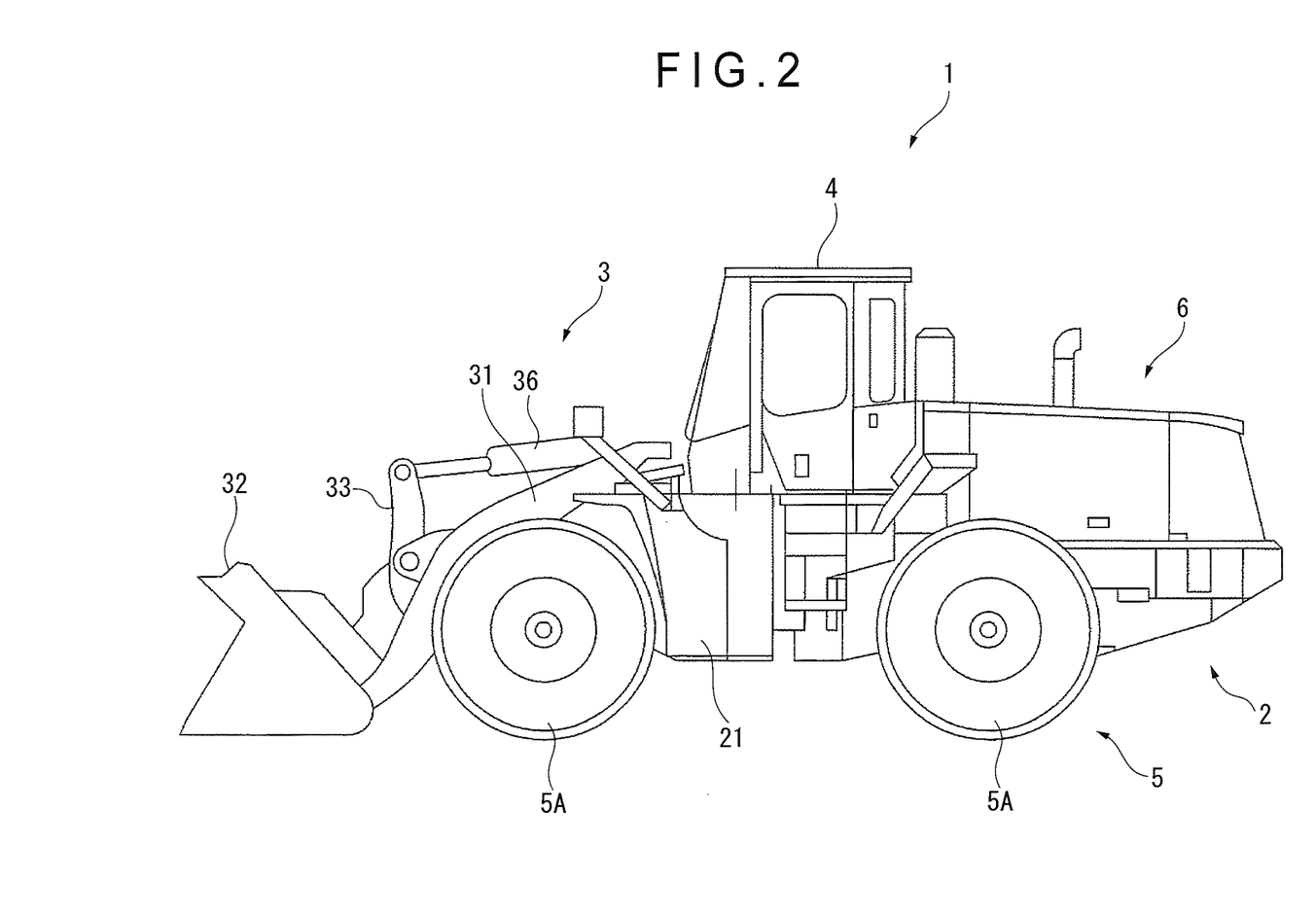
FIG. 2 is a side view showing the work machine according to the exemplary embodiment.

FIGS. 1 and 2 show a wheel loader 1 (a working vehicle) according to an exemplary embodiment of the invention. The wheel loader 1 includes a vehicle body 2, working equipment 3, a cab 4, an undercarriage 5 and a power section 6.

The vehicle body 2 includes a steel frame body supporting the working equipment 3, the cab 4 and the power section 6. A front portion of the vehicle body 2 is provided with a structure 21 rotatable in a right-and-left direction relative to the vehicle body 2. The working equipment 3 is disposed at a front side of the structure 21.

The working equipment 3 includes a boom 31 pivotally supported on the structure 21, a bucket 32 vertically pivotally supported on the boom 31, and a bell crank 33 pivotally supported on the boom 31 near a center of the boom 31.

The boom 31 includes a pair of booms arranged in a vehicle-width direction and pivotally supported to be vertically rotatable relative to the structure 21. A lift cylinder (not shown) is pivotally supported on a center portion of each of the booms 31. A base end of the lift cylinder is pivotally supported on the structure 21. The lift cylinder is hydraulically extended and refracted to vertically rotate each of the booms 31.

The bucket 32 is to be loaded with, for instance, excavated soil. A first end of a link (not shown) is pivotally supported on the bucket 32 at a level above the level where the bucket 32 is pivotally supported on each of the booms 31. A second end of the link is pivotally supported on a lower end of the bell crank 33.

The bell crank 33, which is pivotally supported between the pair of booms 31, has the lower end connected to the second end of the link. A tilt cylinder 36 is pivotally supported on an upper end of the bell crank 33. A base end of the tilt cylinder 36 is pivotally supported on the structure 21.

In an excavation work, the wheel loader 1 is moved forward with the bucket 32 being positioned near a ground level until the bucket 32 is forced into an object to be excavated (e.g., soil and sand), and then the lift cylinder is extended to rotate the boom 31 upward with the bucket 32 being loaded with excavated soil.

Further, when the tilt cylinder 36 is retracted with the bucket 32 being raised, the upper end of the bell crank 33 is rotated toward the vehicle body 2, whereas the lower end of the bell crank 33 is rotated forward relative to the vehicle.

An upper portion of the bucket 32 is thus pushed forward relative to the vehicle by the link, thereby rotating the bucket 32 to unload the excavated soil from the bucket 32 onto the platform of a dump truck or the like.

The undercarriage 5 includes: driving wheels 5A provided to the vehicle body 2 at four lateral positions; axles (not shown in FIGS. 1 and 2) on which each of corresponding pairs of the driving wheels 5A are rotatably supported; and a drive shaft connected to each of the axles substantially at a center in the width direction of the vehicle body 2 via a differential. The drive shaft is connected to an engine installed in the power section 6 through a torque converter. When the engine is rotated, a rotation speed is converted to rotate the drive shaft. The rotation of the drive shaft is transmitted to each of the driving wheels 5A through the differential and the axle(s) so that the wheel loader 1 travels.

[2] Internal Arrangement of Cab 4

Figure 3:
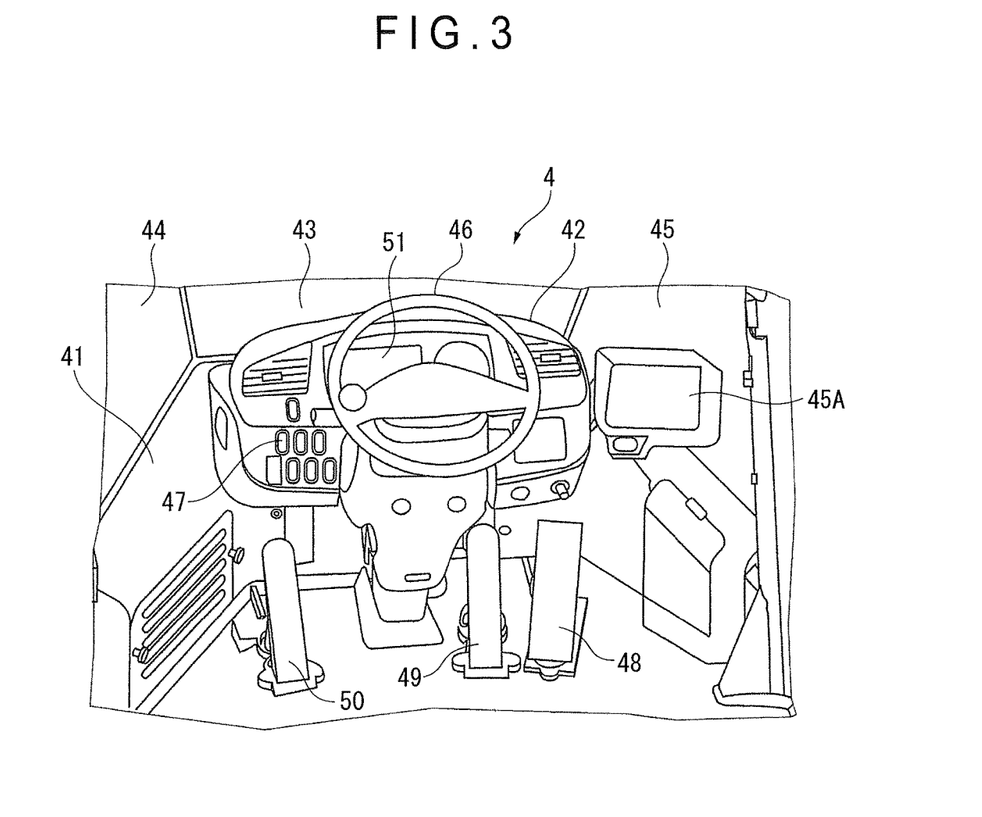
FIG. 3 is a perspective view showing an interior of a cab of the work machine according to the exemplary embodiment.

FIG. 3 shows an arrangement of an operator seat in the cab 4.

The cab 4 includes: a box-shaped body 41 defining an exterior of the cab 4; and a front console unit 42 provided in the box-shaped body 41 at a front side of the box-shaped body 41.

The box-shaped body 41 is provided with a front window 43 at a center thereof, a left-front window 44 at a left-front side thereof and a right-front window 45 at a right-front side thereof to ensure a front visibility for an operator of the wheel loader 1. A rear monitor 45A is provided at a right side of the front console unit 42. The rear monitor 45A displays an image captured by a camera (not shown) attached to a rear end of the vehicle body 2 to ensure a rear visibility for the operator of the wheel loader 1.

The front console unit 42, which defines a front inner wall of the wheel loader 1, includes a variety of devices for operating the wheel loader 1.

A steering wheel 46 is rotatably provided substantially at a center of the front console unit 42. When the operator turns the steering wheel 46, the front portion of the vehicle body 2 is rotated to turn the wheel loader 1.

An operation switch panel 47 is provided at a left side of the steering wheel 46. An operation mode of the wheel loader 1 can be switched between a heavy-load operation mode for an operation oriented to a load and a light-load operation mode for an operation oriented to fuel consumption by operating an operation switch.

Three pedals, which include an accelerator pedal 48 at the right, a right brake pedal 49 at the center, and a left brake pedal 50 at the left, are provided on a floor below the steering wheel 46.

A state information display 51 for the wheel loader 1 is provided at a front side of the steering wheel 46.

Since the operator may advance the wheel loader 1 with the bucket 32 of the working equipment 3 positioned near the ground level, the cab 4 is preferably configured to sufficiently ensure a visibility of a front lower side of the wheel loader 1 for safety purposes. Accordingly, the front console unit 42 is preferably downsized as much as possible and, consequently, the state information display 51 is preferably downsized as much as possible. Especially, when the wheel loader 1 is a middle- or small-sized vehicle, the downsizing is important.

[3] Arrangement of State Information Display 51

Figure 4:
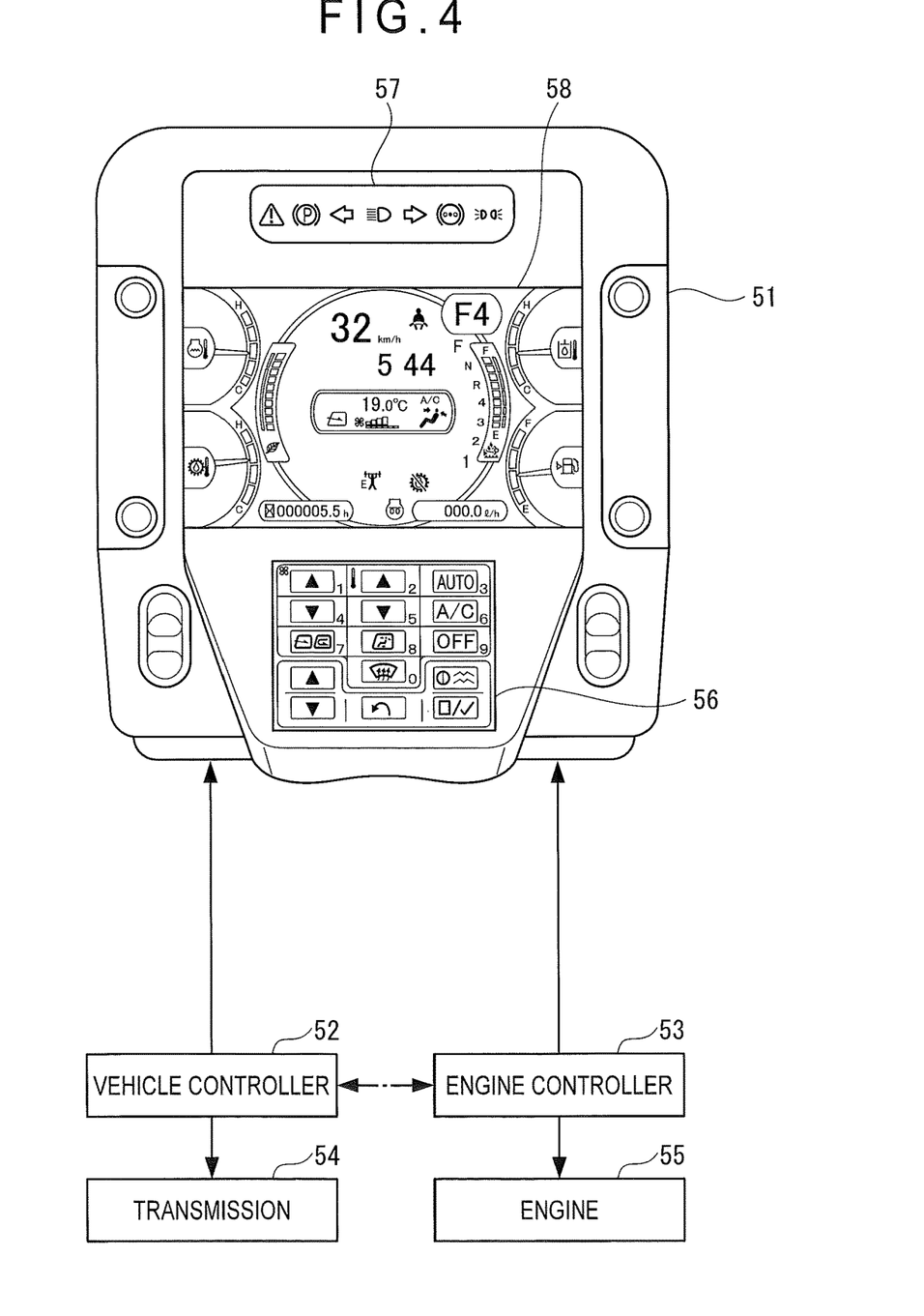
FIG. 4 is a schematic view showing a state information display for the work machine according to the exemplary embodiment.

FIG. 4 is a front view of the state information display 51 provided in the cab 4.

The state information display 51 is connected to a vehicle controller 52 and an engine controller 53 through electrical wiring. The vehicle controller 52 controls the vehicle based on detection values of sensors (not shown) including a temperature sensor and a pressure sensor provided to a driving system including a transmission 54 and a hydraulic circuit system including a hydraulic pump. The engine controller 53 controls the rotation speed of an engine 55 based on values of sensors (not shown) including a rotation speed sensor and a temperature sensor.

The detection values of the sensors provided to the vehicle controller 52 and the engine controller 53 are outputted to the state information display 51 through the electrical wiring.

The state information display 51 includes an operation switch panel 56, an LED indicator panel 57 and a display panel 58. It should be noted that the operation switch panel 56, the LED indicator panel 57 and the display panel 58 may be integral with one another or be independent of one another. The operation switch panel 56 and the LED indicator panel 57 are not requisite.

The operation switch panel 56 includes a variety of operation switches such as a wiper switch, an air-conditioner switch and a switch for switching the display panel 58. The operator can change the environment in the vehicle and the display state of the display panel 58 as desired by operating the operation switches of the operation switch panel 56.

It should be noted that a dedicated command, which is unknown to an unauthorized user, is assigned to the operation switch panel 56, and a maintenance/inspection screen appears on the display panel 58 when a person in charge of maintenance/inspection (a service person of a manufacturer) enters such a secret command (described later in detail). The dedicated command, which is to be entered in the case of maintenance/inspection, is unique to the manufacturer and usually not disclosed to the operator of the wheel loader 1.

The LED indicator panel 57 includes, for instance, a parking lamp, right-turn and left-turn lamps and a light-on lamp, which indicate a part of the operation state of the wheel loader 1. The LED indicator panel 57 also includes a caution sign, which is lit up in red in the case where a trouble occurs somewhere in the wheel loader 1.

The display panel 58, which includes, for instance, a liquid crystal display panel, displays the state in terms of plural aspects in further detail as compared with the LED indicator panel 57.

Figure 5:
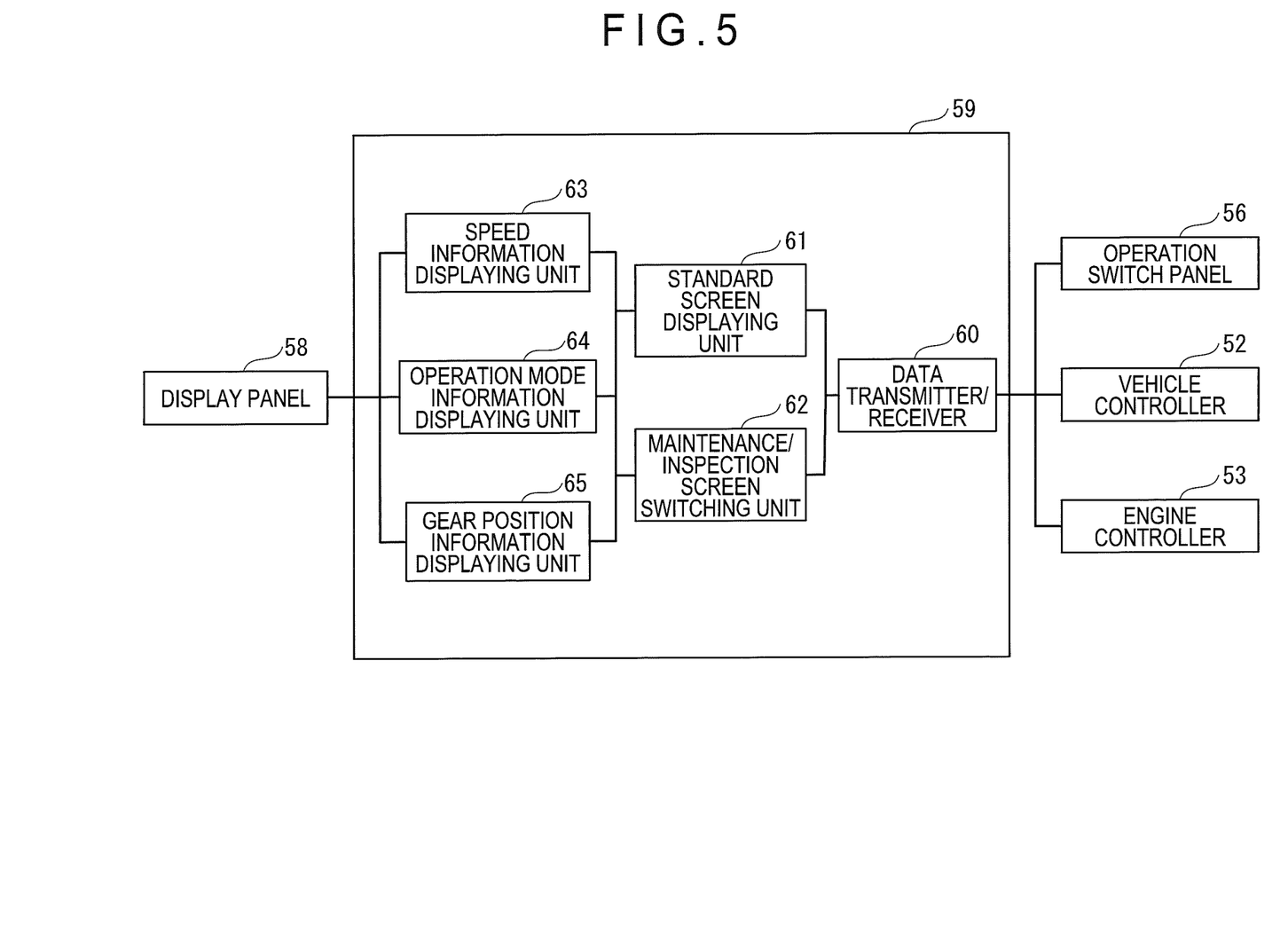
FIG. 5 is a block diagram showing an arrangement of the state information display according to the exemplary embodiment.

FIG. 5 is a functional block diagram of the state information display 51. The state information display 51 includes the display panel 58 (a state information displaying unit) and a display controller 59. The display controller 59 controls display of various kinds of state information of the wheel loader 1 on the display panel 58 based on the detection values of the various sensors outputted from the vehicle controller 52 and the engine controller 53.

The display controller 59 includes a data transmitter/receiver 60, a standard screen displaying unit 61, a maintenance/inspection screen switching unit 62, a speed information displaying unit 63, an operation mode information displaying unit 64 and a gear position information displaying unit 65.

The data transmitter/receiver 60 receives the detection values of the various sensors outputted from the vehicle controller 52 and the engine controller 53, and outputs a setting signal of the operation switch of the operation switch panel 56 operated by the operator to the vehicle controller 52 and/or the engine controller 53 to change the setting of the vehicle controller 52 and/or the setting of the engine controller 53. The data transmitter/receiver 60 also switches the screen of the display panel 58 based on the setting signal of the switch set by operating the operation switch panel 56.

The standard screen displaying unit 61 displays a standard screen showing various kinds of state information during the operation of the wheel loader 1. Specifically, the standard screen displaying unit 61 displays the state information of the wheel loader 1 based on various kinds of information from the sensors received by the data transmitter/receiver 60.

Figure 6:
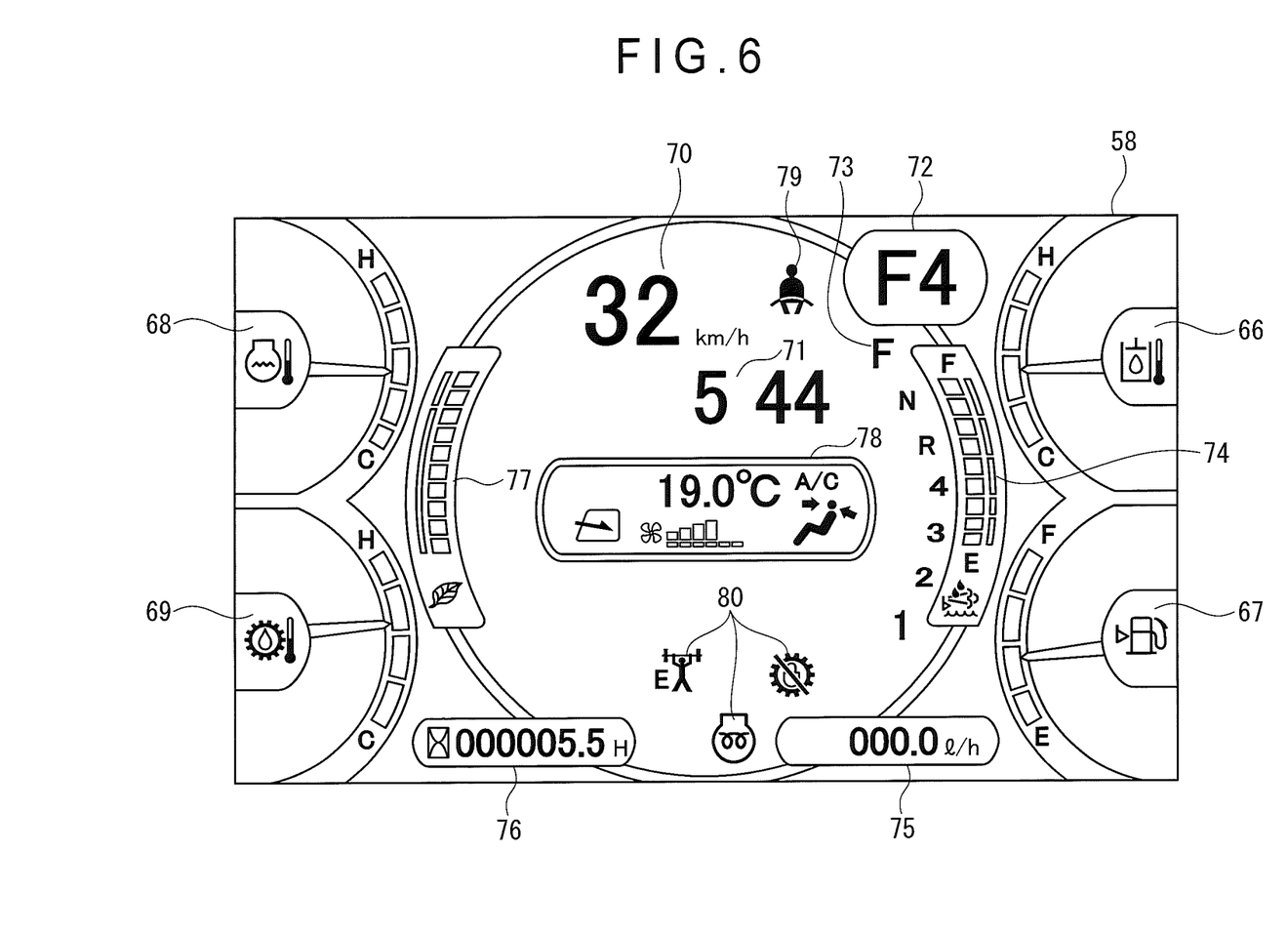
FIG. 6 is a schematic view showing a display area of the state information display according to the exemplary embodiment.

For instance, the following state information is displayed as the standard screen of the display panel 58 as shown in FIG. 6.

Information about the engine, driving system and pump temperature is displayed at the four corners of the display panel 58. The hydraulic oil temperature in the hydraulic circuit of the working equipment 3 is displayed in an upper right area 66 of the display panel 58, and the remaining amount of the engine fuel is displayed in a lower right area 67. The engine water temperature is displayed in an upper left area 68, and the torque converter oil temperature is displayed in a lower left area 69.

The vehicle speed of the wheel loader 1 is displayed in an upper center area 70, and time is displayed in an area 71 below the area 70.

An actual gear position of the wheel loader 1 is displayed in an area 72 at the right of the display of the vehicle speed, and a target gear position set using a gearshift lever (not shown in FIG. 3) provided in the cab 4 is displayed in an area 73 below the area 72. The remaining amount of a urea aqueous solution in a urea selective catalytic reduction (SCR) system is displayed in an area 74 right adjacent to the area 73.

The fuel consumption of the wheel loader 1 during operation is displayed in an area 75 below the area 74. It should be noted that the information displayed in the area 75 can be changed by operating the operation switch(es). In the exemplary embodiment, fuel consumption, travel distance, timepiece and service meter (engine operating time) can be switched to be displayed in the area 75. An area 76 at the left of the area 75 displays the service meter, but plural kinds of information such as travel distance, time and service meter can be switched to be displayed in the area 76 in the same manner as in the area 75.

An area 77 displays an eco gauge indicating whether or not the wheel loader 1 is in an energy-saving operation.

An area 78 displays the setting of the air conditioner. An area 79 displays whether or not a seat belt is fastened. An area 80 displays pilot lamps for various settings, which include a pilot lamp indicating whether the wheel loader 1 works in a heavy-load operation mode (P mode) or in a light-load operation mode (E mode).

The maintenance/inspection screen switching unit 62 switches from the standard screen to the maintenance/inspection screen. A trigger for switching the screen is the unique dedicated command inputted by the service person of the manufacturer using the operation switch panel 56. For instance, specific ones of the switches may be simultaneously operated as the dedicated command.

When the maintenance/inspection screen is switched to be displayed by the maintenance/inspection screen switching unit 62, the speed information displaying unit 63 displays speed information in any one of areas defined in the maintenance/inspection screen. The speed information indicates a vehicle speed determined based on a detection value detected by a rotation sensor provided to the driving wheels 5A and outputted from the engine controller 53.

The operation mode information displaying unit 64 displays whether the wheel loader 1 works in the heavy-load operation mode (P mode) or in the light-load operation mode (E mode) in any one of the areas defined in the maintenance/inspection screen.

When the maintenance/inspection screen is switched to be displayed by the maintenance/inspection screen switching unit 62, the gear position information displaying unit 65 displays actual gear position information of the torque converter connected to the engine in the power section 6.

It should be noted that the speed information displaying unit 63, the operation mode information displaying unit 64 and the gear position information displaying unit 65 each function to display the information in the standard screen as well as in the maintenance/inspection screen.

[4] Process and Advantage(s) of Exemplary Embodiment

Figure 7:
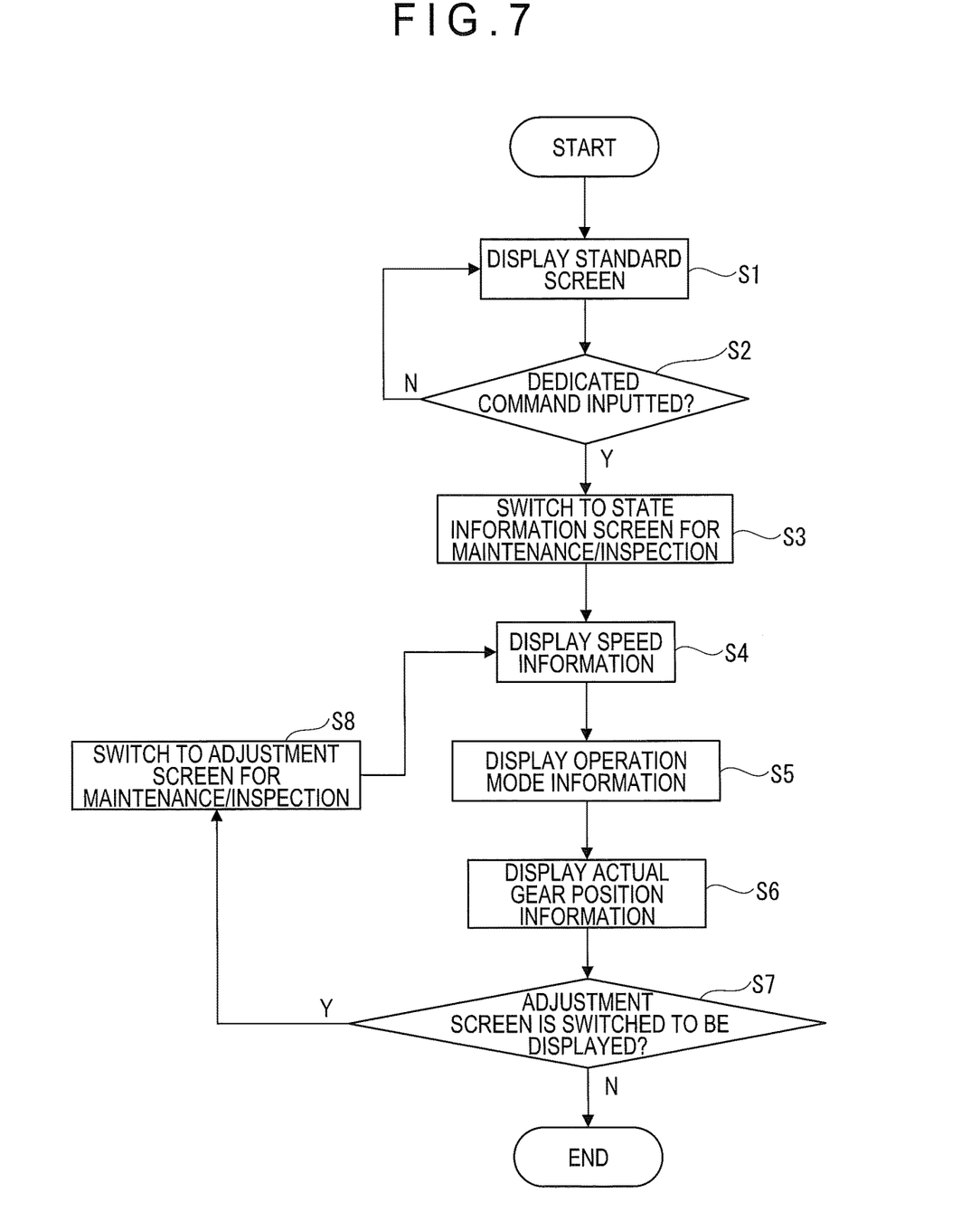
FIG. 7 is a flow chart for illustrating a process according to the exemplary embodiment.

Next, a process according to the exemplary embodiment will be described with reference to a flow chart shown by FIG. 7. It should be noted that the process of the flow chart shown by FIG. 7 is configured in the form of, for instance, a computer program and performed by the display controller 59.

During the operation of the wheel loader 1, the standard screen displaying unit 61 displays the standard screen of FIG. 6 so that the operator can see the various kinds of state information about the wheel loader 1 (step S1).

The standard screen displaying unit 61 monitors whether or not the dedicated command is inputted using the operation switch panel 56 via the data transmitter/receiver 60 (step S2).

Figure 8:
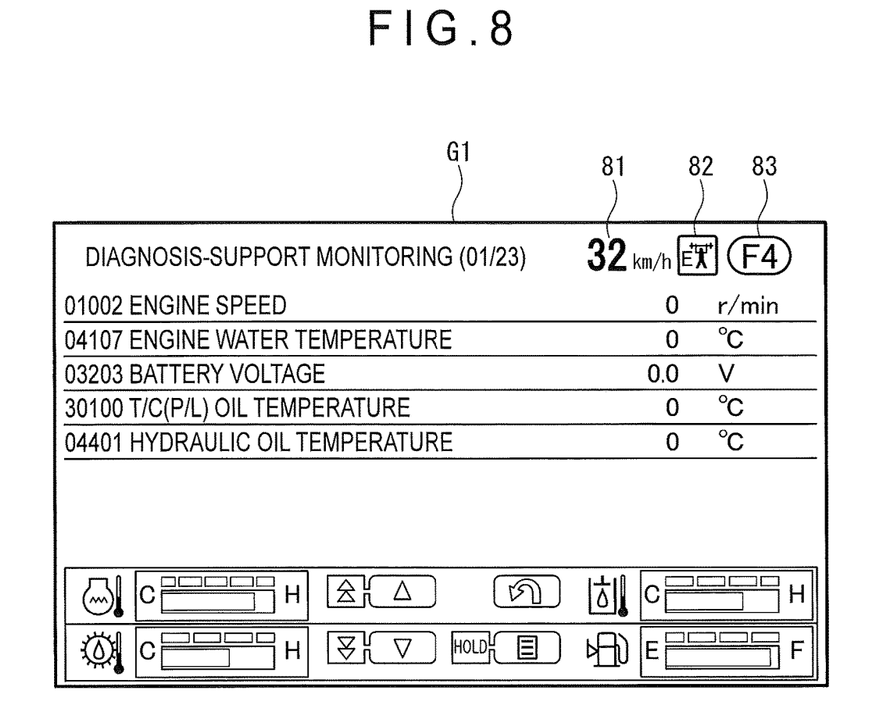
FIG. 8 is a schematic view showing an example of a state information screen for maintenance/inspection according to the exemplary embodiment.

When the standard screen displaying unit 61 determines that the dedicated command is inputted while the standard screen is displayed, the maintenance/inspection screen switching unit 62 switches from the standard screen to a state information screen G1 shown by FIG. 8 (the maintenance/inspection screen) (step S3).

Upon determination that the state information screen G1 of FIG. 8 is switched to be displayed, the speed information displaying unit 63 displays speed information 81 in an upper right area (step S4).

Simultaneously, the operation mode information displaying unit 64 displays operation mode information 82 at the right of the speed information 81 (step S5).

Further, the gear position information displaying unit 65 displays actual gear position information 83 at the right of the operation mode information 82 (step S6).

Figure 9:
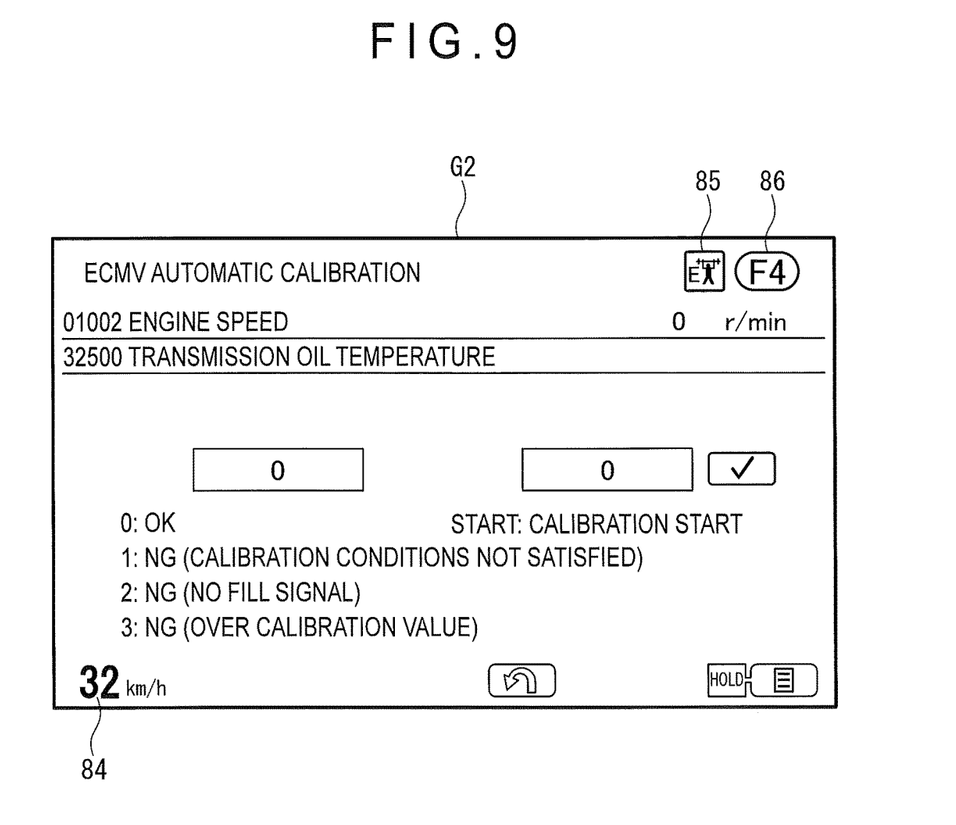
FIG. 9 is a schematic view showing an example of a sensor adjustment screen for maintenance/inspection according to the exemplary embodiment.

The maintenance/inspection screen switching unit 62 further switches to a sensor adjustment screen G2 (the maintenance/inspection screen) as shown in FIG. 9 when the operator inputs a request for switching to the sensor adjustment screen (step S7).

Upon determination that the sensor adjustment screen G2 of FIG. 9 is switched to be displayed, the speed information displaying unit 63 displays speed information 84 near a lower edge of the sensor adjustment screen G2 (step S4).

Similarly, the operation mode information displaying unit 64 displays the operation mode information 85 at an upper right area in the sensor adjustment screen G2 (step S5).

Further, the gear position information displaying unit 65 displays gear position information 86 at the right of the operation mode information 85 (step S6).

The service person of the manufacturer can check the speed information 84, the operation mode information 85 and the gear position information 86 in the sensor adjustment screen G2 while adjusting the components of the wheel loader 1.

The exemplary embodiment provides the following advantage(s).

The speed information displaying unit 63 displays the speed information 81 (84) of the wheel loader 1 when the maintenance/inspection screen G1 (G2) is switched to be displayed. Therefore, the service person of the manufacturer can check the speed information during maintenance and/or inspection, so that he/she can safely perform maintenance and/or inspection while driving the wheel-type working vehicle.

Even when the maintenance/inspection screen G1 (G2) is switched to be displayed, the operation mode information 82 (85) of the wheel loader 1 is visible in the maintenance/inspection screen G1 (G2). Therefore, the service person can check the operation mode information 82 (85) while performing maintenance and/or inspection, so that he/she can understand the operation state in further detail and thus easily diagnose a trouble or the like.

Even when the maintenance/inspection screen G1 (G2) is switched to be displayed, the actual gear position information 83 (86) of the wheel loader 1 is visible in the maintenance/inspection screen G1 (G2). Therefore, the service person can check the actual gear position information 83 (86) while performing maintenance and/or inspection, so that he/she can predict a speed to be reached in the adjustment of the accelerator or the like. The maintenance and/or inspection can thus be safely performed.

The state information screen G1 and the sensor adjustment screen G2 respectively show the speed information 81, 84, the operation mode information 82, 85 and the actual gear position information 83, 86. Therefore, such information and the like can be checked during maintenance and/or inspection, so that the service person can adjust the sensor while safely driving the wheel loader 1.

[5] Modification(s) of Exemplary Embodiment

Incidentally, it should be understood that the scope of the invention is not limited to the above-described exemplary embodiment, but includes modifications and improvements compatible with the invention.

For instance, although the wheel-type working vehicle is the wheel loader 1 in the exemplary embodiment, the invention is also applicable to various wheel-type working vehicles such as a motor grader, a forklift and a dump truck.

The invention is applied to the work machine employing a torque converter in the exemplary embodiment, but may be applied to a work machine employing a hydro static transmission (HST).

Each of the speed information 81 (84), the operation mode information 82 (85) and the actual gear position information 83 (86) is displayed at the corners of the display panel 58 in the exemplary embodiment, but may be displayed at any position as long as information for maintenance/inspection is visible.

The dedicated command is inputted as the predetermined dedicated operation in the exemplary embodiment, but any other operation (e.g., a secret switch unknown to the operator, or an operation performed by a dedicated terminal or a computer) is also available as the predetermined dedicated operation.

The invention claimed is:
1. A state information display for a wheel-type working vehicle, the state information display comprising:
   a state information displaying unit configured to display plural kinds of state information of the wheel-type working vehicle; and
   a display controller configured to control display of the state information displaying unit, the display controller comprising:
      a standard screen displaying unit configured to display the plural kinds of state information to a full screen in a form of a standard screen during an operation of the wheel-type working vehicle;
      a maintenance/inspection screen switching unit configured to switch the standard screen, in response to: data that is received from a rotation sensor associated with driving wheels of the wheel-type working vehicle and indicates rotation of the driving wheels of the wheel-type working vehicle and a predetermined operation, to display a maintenance/inspection screen for the wheel-type working vehicle, which is not disclosed to an operator of the wheel-type working vehicle, to the full screen during a travelling of the wheel-type working vehicle, the maintenance/inspection screen displaying information showing an operation state of the wheel-type working vehicle, which information is not displayed in the standard screen; and a speed information displaying unit configured to display at least one of vehicle speed determined based on the data from the rotation sensor associated with the driving wheels of the wheel-type working vehicle or an actual gear position determined based on data from a torque converter connected to an engine of the wheel-type working vehicle in any one of areas defined in the maintenance/inspection screen.

2. The state information display for the wheel-type working vehicle according to claim 1, wherein
the wheel-type working vehicle works in a heavy-load operation mode for an operation oriented to a load or in a light-load operation mode for an operation oriented to fuel consumption, and
the display controller further comprises an operation mode information displaying unit configured to display information about whether the wheel-type working vehicle works in the heavy-load operation mode or in the light-load operation mode in any one of the areas defined in the maintenance/inspection screen when the maintenance/inspection screen is switched to be displayed by the maintenance/inspection screen switching unit.

3. The state information display for the wheel-type working vehicle according to claim 1, wherein
the wheel-type working vehicle is an engine-driven working vehicle, and
the display controller further comprises a gear position information displaying unit configured to display a gear position in any one of the areas defined in the maintenance/inspection screen when the maintenance/inspection screen is switched to be displayed by the maintenance/inspection screen switching unit.

4. The state information display for the wheel-type working vehicle according to claim 1, wherein
the maintenance/inspection screen switching unit switches between a state information screen and a sensor adjustment screen, the state information screen showing plural kinds of state information different from the plural kinds of state information shown by the standard screen, the sensor adjustment screen being used for adjusting a sensor related to any one of the plural kinds of state information shown by the state information screen, and
the speed information displaying unit displays the speed information not only in the state information screen but also in the sensor adjustment screen.

5. A method for controlling a state information display for a wheel-type working vehicle, the method comprising:
displaying plural kinds of state information of the wheel-type working vehicle; and
controlling display of the plural kinds of state information, the controlling comprising:
displaying the plural kinds of state information to a full screen in a form of a standard screen during an operation of the wheel-type working vehicle;
switching the standard screen, in response to: data that is received from a rotation sensor associated with driving wheels of the wheel-type working vehicle and indicates rotation of the driving wheels of the wheel-type working vehicle and a predetermined operation, to display a maintenance/inspection screen for the wheel-type working vehicle, which is not disclosed to an operator of the wheel-type working vehicle, to the full screen during a travelling of the wheel-type working vehicle, the maintenance/inspection screen displaying information showing an operation state of the wheel-type working vehicle, which information is not displayed in the standard screen; and
displaying at least either one of vehicle speed determined based on the data from the rotation sensor associated with the driving wheels of the wheel-type working vehicle or an actual gear position determined based on data from a torque converter connected to an engine of the wheel-type working vehicle in one of areas defined in the maintenance/inspection screen.

6. A computer-readable medium with a computer-readable program allowing a display controller for a wheel-type working vehicle to execute a method comprising:
displaying plural kinds of state information of the wheel-type working vehicle; and
controlling display of the plural kinds of state information, the controlling comprising:
displaying the plural kinds of state information to a full screen in a form of a standard screen during an operation of the wheel-type working vehicle;
switching the standard screen, in response to: data that is received from a rotation sensor associated with driving wheels of the wheel-type working vehicle and indicates rotation of the driving wheels of the wheel-type working vehicle and a predetermined operation, to display a maintenance/inspection screen for the wheel-type working vehicle, which is not disclosed to an operator of the wheel-type working vehicle, to the full screen during a travelling of the wheel-type working vehicle, the maintenance/inspection screen displaying information showing an operation state of the wheel-type working vehicle, which information is not displayed in the standard screen; and
displaying at least either one of vehicle speed determined based on the data from the rotation the rotation sensor associated with the driving wheels of the wheel-type working vehicle or an actual gear position determined based on data from a torque converter connected to an engine of the wheel-type working vehicle in one of areas defined in the maintenance/inspection screen when the maintenance/inspection screen is switched to be displayed.

* * * * *